(12) United States Patent
Takagi (10) Patent No.: US 8,522,145 B2
(45) Date of Patent: Aug. 27, 2013

(54) METHOD AND SYSTEM FOR EDITING CONTENT IN SERVER

(75) Inventor: Koichi Takagi, Saitama (JP)

(73) Assignee: KDDI Corporation, Tokyo (JP)

( * ) Notice: Subject to any disclaimer, the term of this patent is extended or adjusted under 35 U.S.C. 154(b) by 574 days.

(21) Appl. No.: 12/755,059

(22) Filed: Apr. 6, 2010

(65) Prior Publication Data

US 2010/0262913 A1 Oct. 14, 2010

(30) Foreign Application Priority Data

Apr. 9, 2009 (JP) .................................. 2009-094990

(51) Int. Cl.
*G06F 3/00* (2006.01)
*G11B 27/00* (2006.01)
*H04N 5/93* (2006.01)

(52) U.S. Cl.
USPC .......................................... 715/723; 386/285

(58) Field of Classification Search
None
See application file for complete search history.

(56) References Cited

U.S. PATENT DOCUMENTS

| | | | |
|---|---|---|---|
| 6,005,678 A * | 12/1999 | Higashida et al. | 358/452 |
| 2002/0145622 A1* | 10/2002 | Kauffman et al. | 345/723 |
| 2004/0150663 A1* | 8/2004 | Kim | 345/723 |
| 2005/0025454 A1* | 2/2005 | Nakamura et al. | 386/52 |
| 2006/0156219 A1* | 7/2006 | Haot et al. | 715/500.1 |
| 2006/0168521 A1* | 7/2006 | Shimizu et al. | 715/530 |
| 2006/0236221 A1* | 10/2006 | McCausland et al. | 715/500.1 |
| 2009/0106200 A1* | 4/2009 | Salinas et al. | 707/3 |
| 2009/0217166 A1* | 8/2009 | Kojo et al. | 715/723 |
| 2010/0014586 A1* | 1/2010 | Scarpino et al. | 375/240.15 |

FOREIGN PATENT DOCUMENTS

| | | |
|---|---|---|
| JP | 2001-346159 A | 12/2001 |
| JP | 2007-036783 A | 2/2007 |
| JP | 4104071 B2 | 6/2008 |
| JP | 2009-501491 A | 1/2009 |
| WO | 2007/011329 A1 | 1/2007 |
| WO | 2008/054505 A2 | 5/2008 |

OTHER PUBLICATIONS

Japanese Office Action dated Dec. 19, 2012 issued in corresponding Japanese patent application No. A 2009-094990, w/ English translation.

* cited by examiner

*Primary Examiner* — Stephen Alvesteffer
(74) *Attorney, Agent, or Firm* — Westerman, Hattori, Daniels & Adrian, LLP (57) ABSTRACT

Techniques of allowing a communication terminal to edit original content stored in a content server are disclosed. According to the techniques, the original content is converted into decimated and downsized proxy content; the proxy content is transmitted from the content server to the communication terminal; the proxy content is displayed on a display screen of the communication terminal; in response to a user's editing operation on the communication terminal, proxy-editing information is produced by the communication terminal; the proxy-editing information is transmitted from the communication terminal to the content server; and the content server edits the original content in accordance with the proxy-editing information.

16 Claims, 6 Drawing Sheets

METHOD AND SYSTEM FOR EDITING CONTENT IN SERVER

CROSS-REFERENCE TO RELATED APPLICATIONS

The present application is based on and claims the benefit of priority from Japanese Patent Application No. 2009-094990 filed Apr. 9, 2009, the content of which is incorporated herein by reference in its entirety.

BACKGROUND OF THE INVENTION

1. Field of the Invention

The invention relates generally to techniques of editing video content data stored in a content server, and more particularly to techniques of allowing a communication terminal to edit the video content data stored in the content server.

2. Description of the Related Art

There is known an apparatus for storing content including video content and/or audio content in a storage device such as a hard disc, and for editing (e.g., trimming or clipping) the content. Examples of such an apparatus include a home AV (Audio-Visual) device, or a personal computer (PC). Such an apparatus is configured to allow a user to conduct an editing operation for selected content, while the content is being played back. Then, such an apparatus edits the content in accordance with the user's editing operation.

There is also a known technique of allowing a data transmission unit (e.g., a terminal) to transmit to a data editing unit (e.g., a server) via a network, video content which has been captured, together with editing information which has been produced to reflect a user's operation or manipulation, as disclosed in, for example, Japanese Patent Application Publication No. 2001-346159.

In this technique, the data editing unit edits the video content in accordance with the editing information which has been received from the data transmission unit. This technique requires the data transmission unit to upload the video content entirely and intactly, via the network.

There is also a known technique, for reducing a transmission cost for a network, of reformatting original content into downsized substitute content for editing, through a conventional compression scheme, as disclosed in, for example, a first non-patent literature, titled "Editing Support for Linkage with MPEG Movie Camera," Japan Patent Office>Archives (other references)>Collection of Standard Techniques>Non-linear Editing>6-3, online, visited on Apr. 1, 2009, Internet<URL:http://www.jpo.go.jp/shiryou/s_sonota/hyoujun_gijut su/nle/nle-6-3.html>.

In contrast, there is a known technique of editing, by a mobile terminal, video content stored in a content server. This technique requires the mobile terminal to download the video content entirely and intactly, via a network.

In this regard, the user is required to instruct the mobile terminal to perform a high speed playback in search for an edit point in the video content.

On the other hand, there is a known technique of performing a macro (coarse) search in which ones of images are selected and displayed at intervals of a long search time, and subsequently a micro (fine) search in which displaying of the images starts at a selected one of the images, and ones of the images are selected and displayed at intervals of a short search time, to allow the user to identify an edit point for a reduced time, as disclosed in, for example, Japanese Patent No. 4104071.

This would not require original content to be downloaded entirely from a content server, and would require only some of all the images which occur at interval of the long and short search times, to be downloaded. This can reduce the cost required for transmission and the length of time required for editing.

In addition, there is a known technique of detecting positions at which consecutive video frames in content change in feature, and of assigning these positions to candidate cut-points for cutting away a portion of the content for cut-editing, as disclosed in, for example, the second non-patent literature, titled "Automated Indexing of Video Information," Japan Patent Office>Archives (other references)>Collection of Standard Techniques>Non-linear Editing>4-2-1, online, visited on Apr. 1, 2009, Internet<URL:http://www.jpo.go.jp/shiryou/s_sonota/hyoujun_gijut su/nle/nle-4-2-1.html>.

BRIEF SUMMARY OF THE INVENTION

The conventional techniques as described above, however, originally require a communication terminal, which is used for editing video content, to have a relatively high processing capability like a personal computer.

For this reason, it is very difficult for a communication terminal alone, if it has a relatively low processing capability like a mobile phone, to edit video content. Such a mobile phone can play back video content, only if the video content is small in data size, and low in resolution or gradation.

In general, a user conducts an editing operation for video content while the user is viewing the video content and is concurrently listening to the sound of the video content. On the other hand, it can be found that, typically, a user edits content by operating the user's mobile phone when the user is outside of the user's home. Therefore, it is difficult for the user to conduct an editing operation while listening to the sound of the video content in a typical environment, that is, outside home.

In view of the foregoing, it would be desirable to make it easier for a communication terminal, even if it has a low processing capacity, to edit video content stored in a content server, with the aid of the user's visual perception representations.

BRIEF SUMMARY OF THE INVENTION

In general, the invention relates to techniques of allowing a communication terminal to edit original content which is structured to include video content in the form of a series of video frames, and which has been stored in a content server.

According to some aspects of the invention, the original content is converted or reformatted into decimated and downsized proxy or substitute content; the proxy content is transmitted from the content server to the communication terminal; the proxy content is displayed on a display screen of the communication terminal; in response to a user's editing operation on the communication terminal, proxy-editing information is produced by the communication terminal; the proxy-editing information is transmitted from the communication terminal to the content server; and the content server actually edits the original content in accordance with the proxy-editing information.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

According to a first aspect of the invention, there is provided a method of allowing a communication terminal to edit original content which is structured to include video content in the form of a series of video frames and which has been stored in a content server, the method comprising:

a first step of converting, by the content server, the original content into proxy content in which the video content is decimated by extracting ones of the series of video frames of the original content at time intervals of a preset unit time, wherein the preset unit time is equal to a time span between adjacent ones of the extracted video frames of the original content;

a second step of transmitting, by the content server, the proxy content to the communication terminal;

a third step of displaying, by the communication terminal, the proxy content on a display screen of the communication terminal, and of producing proxy-editing information in response to a user's editing operation on the communication terminal;

a fourth step of transmitting, by the communication terminal, the proxy-editing information to the content server; and a fifth step of editing, by the content server, the original content in accordance with the proxy-editing information.

This method would allow a user of the communication terminal to edit the proxy content which is smaller in data size than the original content stored in the content server, while viewing the decimated video content of the proxy content which is displayed by the communication terminal.

Therefore, this method would make it easier for the communication terminal, even if it has only a relatively low processing capacity like a mobile terminal, for example, to eventually edit the original content stored in the content server.

In addition, this method may be practiced, not only when the communication terminal is a mobile terminal (e.g., a mobile phone, a PHS, a pager, a PDA, etc.), but also when the communication terminal is a personal computer which is, in general, higher in the processing capability than a mobile terminal.

When this method is practice with a personal computer used as the communication terminal, this method would make it easier for the personal computer to eventually edit the original content stored in the content server, with reduced computational load required for the editing.

According to a second aspect of the invention, there is provided a content server for editing original content in accordance with editing information from a communication terminal, wherein the original content is structured to include video content in the form of a series of video frames, and has been stored in the content server, the content server comprising:

an original-content storage storing the original content;

a content-data converter for converting the original content into proxy content in which the video content is decimated by extracting ones of the series of video frames of the original content at time intervals of a preset unit time, wherein the preset unit time is equal to a time span between adjacent ones of the extracted video frames of the original content;

a proxy-content transmitter for transmitting the proxy content to the communication terminal;

a proxy-editing-information receiver for receiving proxy-editing information from the communication terminal; and a real-editing section configured to actually edit the original content in accordance with the proxy-editing information.

According to a third aspect of the invention, there is provided a system comprising: a content server for storing original content which is structured to include video content in the form of a series of video frames; and a communication terminal communicable with the content server, wherein the content server includes:

an original-content storage storing the original content;

a content-data converter for converting the original content into proxy content in which the video content is decimated by extracting ones of the series of video frames of the original content at time intervals of a preset unit time, wherein the preset unit time is equal to a time span between adjacent ones of the extracted video frames of the original content;

a proxy-content transmitter for transmitting the proxy content to the communication terminal;

a proxy-editing-information receiver for receiving proxy-editing information from the communication terminal; and a real-editing section configured to actually edit the original content in accordance with the proxy-editing information; and wherein the communication terminal includes:

a proxy-content receiver for receiving the proxy content from the content server;

an editing-operation controller for displaying the proxy content on a display screen of the communication terminal, and of receiving a user's editing operation on the communication terminal;

a proxy-editing information generator for generating the proxy-editing information in response to the user's editing operation; and a proxy-editing-information transmitter for transmitting the proxy-editing information to the content server.

Illustrative Embodiments

According to the invention, the following modes are provided as illustrative embodiments of the invention.

According to a first mode of the invention, there is provided the method according to the first aspect of the invention, wherein the first step comprises at least one of a sub-step of altering a length of the preset unit time such that the length becomes shorter as a change in a motion vector between the video frames of the original content becomes larger, and a sub-step of reducing at least one of a resolution and a number of tone levels of the video frames of the proxy content, relative to the original content.

According to a second mode of the invention, the method according to the first aspect or the first mode of the invention, wherein the original content further includes audio content, the first step includes a sub-step of extracting, by the content server, audio frames from the original content at time intervals of the preset unit time, in association with the respective video frames of the proxy content, and of incorporating, by the content server, sound levels of the audio frames into the proxy content, in association with the respective video frames of the proxy content, and the third step includes a sub-step of displaying, by the communication terminal, visual representations of the sound levels along a timeline, in association with the respective video frames of the proxy content.

According to a third mode of the invention, the method according to the second mode of the invention, wherein the first step further includes a sub-step of defining each audio frame of the proxy content, such that each audio frame has a unique portion having a same length as that of the preset unit time, and such that each audio frame has in- and out-tails extended from the unique portion forward and rearward, respectively, wherein the in-tail overlaps with a trailing end of a subsequent audio frame to each audio frame, and is duplicated to the trailing end, and the out-tail overlaps with a leading end of a previous audio frame to each audio frame, and is duplicated to the leading end.

According to a fourth mode of the invention, the method according to any one of the first aspect and the first through third modes of the invention, wherein the fifth step includes a sub-step of, when the proxy-editing information indicates that a portion of the proxy content which spans a range from an In point to an Out point should be cut away from the proxy content, editing the original content to cut away a portion of the original content which spans a range from one of a predetermined number of consecutive video frames of the original content which occur at and before the In point, to one of a predetermined number of consecutive video frames of the original content which occur at and after the Out point.

According to a fifth mode of the invention, the method according to any one of the first aspect and the first through fourth modes of the invention, wherein the fifth step includes a first sub-step of, when the proxy-editing information indicates that cut-editing should be rendered for the proxy content between two distant positions in the proxy content, combining corresponding two distant positions of the original content together such that one of the two fades in, and the other fades out, and a second sub-step of, when the proxy-editing information indicates that transition-editing should be rendered for the proxy content between two distant positions in the proxy content, combining corresponding two distant positions of the original content together such that the two are cross-faded.

According to a sixth mode of the invention, the content server according to the second aspect of the invention, wherein the content-data converter comprises at least one of a section of altering a length of the preset unit time such that the length becomes shorter as a change in a motion vector between the video frames of the original content becomes larger, and a section of reducing at least one of resolution and graduation of the proxy content, relative to the original content.

According to a seventh mode of the invention, the system according to the third aspect of the invention, wherein the original content further includes audio content, the content-data converter of the content server includes a section of extracting audio frames from the original content at time intervals of the preset unit time, in association with the respective video frames of the proxy content, and of incorporating sound levels of the audio frames into the proxy content, in association with the respective video frames of the proxy content, and the edit-operation controller of the communication terminal includes a section of displaying visual representations of the sound levels along a timeline, in association with the respective video frames of the proxy content.

According to an eighth mode of the invention, the system according to the seventh mode of the invention, wherein the content-data converter of the content server further includes a section of defining each audio frame of the proxy content, such that each audio frame has a unique portion having a same length as that of the preset unit time, and such that each audio frame has in- and out-tails extended from the unique portion forward and rearward, respectively, wherein the in-tail overlaps with a trailing end of a subsequent audio frame to each audio frame, and is duplicated to the trailing end, and the out-tail overlaps with a leading end of a previous audio frame to each audio frame, and is duplicated to the leading end.

According to a ninth mode of the invention, the system according to any one of the third aspect and the sixth through eighth modes of the invention, wherein the proxy-editing information generator of the communication terminal includes a section of, when the proxy-editing information indicates that a portion of the proxy content which spans a range from an In point to an Out point should be cut away from the proxy content, editing the original content to cut away a portion of the original content which spans a range from one of a predetermined number of consecutive video frames of the original content which occur at and before the In point, to one of a predetermined number of consecutive video frames of the original content which occur at and after the Out point.

According to a tenth mode of the invention, the system according to any one of the third aspect and the sixth through ninth modes of the invention, wherein the real-editing section includes a first sub-section of, when the proxy-editing information indicates that cut-editing should be rendered for the proxy content between two distant positions in the proxy content, combining corresponding two distant positions of the original content together such that one of the two fades in, and the other fades out, and a second sub-section of, when the proxy-editing information indicates that transition-editing should be rendered for the proxy content between two distant positions in the proxy content, combining corresponding two distant positions of the original content together such that the two are cross-faded.

According to an eleventh mode of the invention, a computer-readable non-transitory storage medium having stored therein a program which, when executed by a computer of a communication terminal, effects the method according to any one of the first aspect and the first through fifth modes of the invention.

The "computer-readable non-transitory storage medium" may be realized in any one of a variety of types, including a magnetic recording medium, such as a flexible-disc, an optical recording medium, such as a CD and a CD-ROM, an optical-magnetic recording medium, such as an MO, an unremovable storage, such as a ROM, for example.

According to a twelfth mode of the invention, the method according to any one of the first aspect and the first through fifth modes of the invention, wherein the communication terminal is a mobile terminal.

According to a thirteenth mode of the invention, the method according to any one of the first aspect and the first through fifth modes of the invention, wherein the first step is implemented to cause the content server to convert the original content to the proxy content, such that the proxy content has a data size small enough for the mobile terminal to process the proxy content.

Several presently preferred embodiments of the invention will be described in more detail by reference to the drawings in which like numerals are used to indicate like elements throughout.

Figure 1:
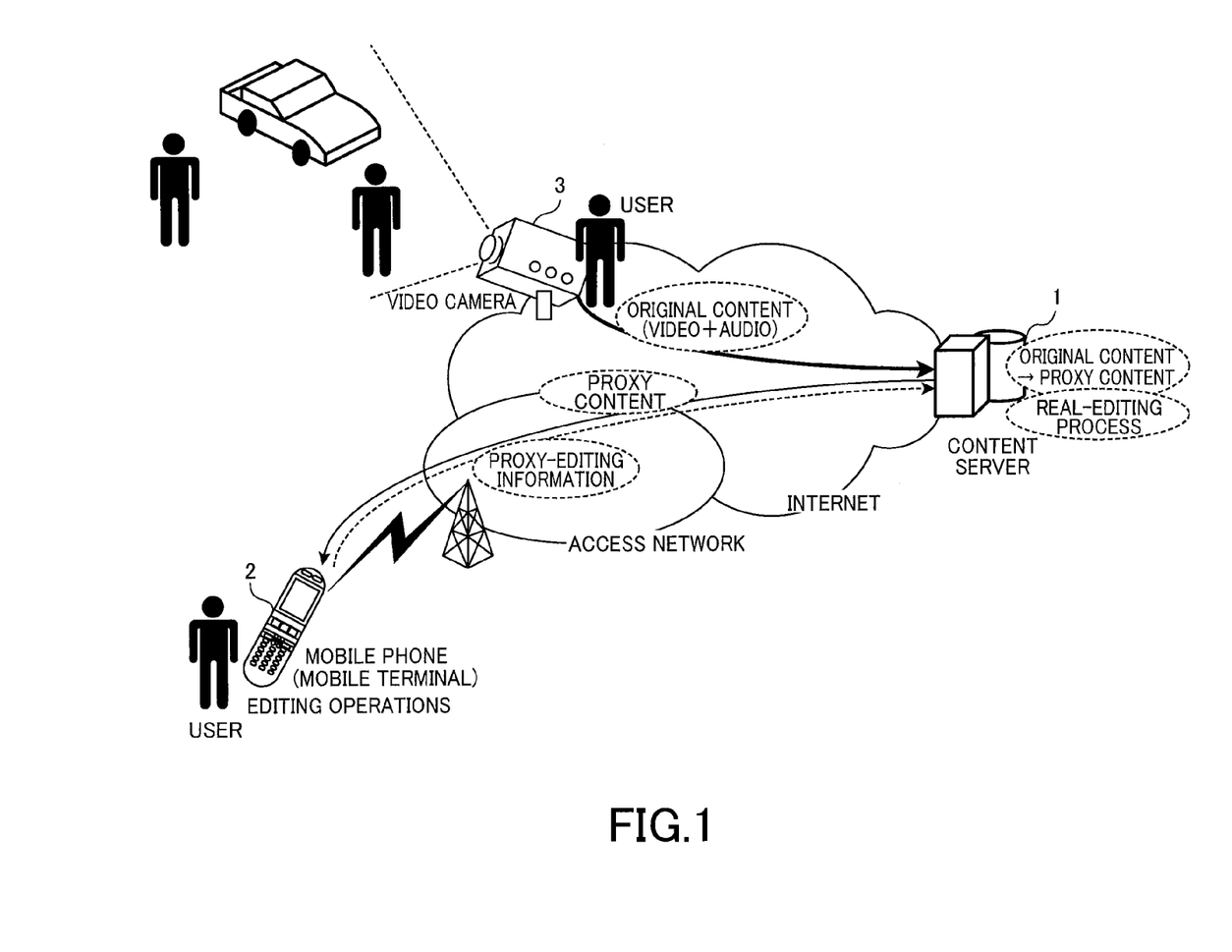
FIG. 1 is a schematic view illustrating the configuration of a system according to an illustrative embodiment of the present invention.

Referring now to FIG. 1, the configuration of a system according to an embodiment of the present invention is illustrated.

As illustrated in FIG. 1, a mobile phone 2 (i.e., a non-exclusive exemplary communication terminal) and a video camera 3 both of which are owned by a user are connected with a content server 1 via a network (i.e., an access network and/or the Internet).

Original content (i.e., content data having video content data and audio content data) which has been captured by the video camera 3 is uploaded to the content server 1 which, in turn, stores the original content.

Then, the content server 1 converts or reformats the original content (i.e., content data having a larger size) into downsized substitute content which will be also referred to as "proxy content," through frame decimation or extraction as described below, before direct or real editing by the content server 1 for the original content.

In other words, the content server 1 performs conversion into the proxy content (i.e., edit-supporting content, alternate content for editing, or decimated content) having a data size small enough to allow a communication terminal or mobile terminal in the form of, for example, the mobile phone 2, to playback or process the proxy content.

In the present embodiment, the user operates the mobile phone 2 to instruct the content server 1 to edit the original content, while viewing the proxy content which has been downsized, instead of the original content, on a display screen of the mobile phone 2. Further, the original content is actually edited by not the mobile phone 2 but the content server 3 that has a higher processing capability. In view of these, the user's manipulation on the mobile phone 2 can be referred to as "proxy editing," for example.

In other words, while a process of editing the proxy content is referred to as "proxy editing" or "indirect editing," a process of editing the original content is referred to as "real editing" or "direct editing."

Then, the proxy content is sent from the content server 1 to the mobile phone 2. The mobile phone 2 allows the user to view and listen to the proxy content, and receives from the user, proxy-editing operations or manipulation for the proxy content, to thereby create proxy-editing information (which indicates how to edit the original content).

The proxy-editing information is sent from the mobile phone 2 to the content server 1 which, in turn, actually edits the original content, in accordance with the proxy-editing information. This allows the user to indirectly edit the original content stored in the content server 1, by operating the mobile phone 2, via the content server 1.

Figure 2:
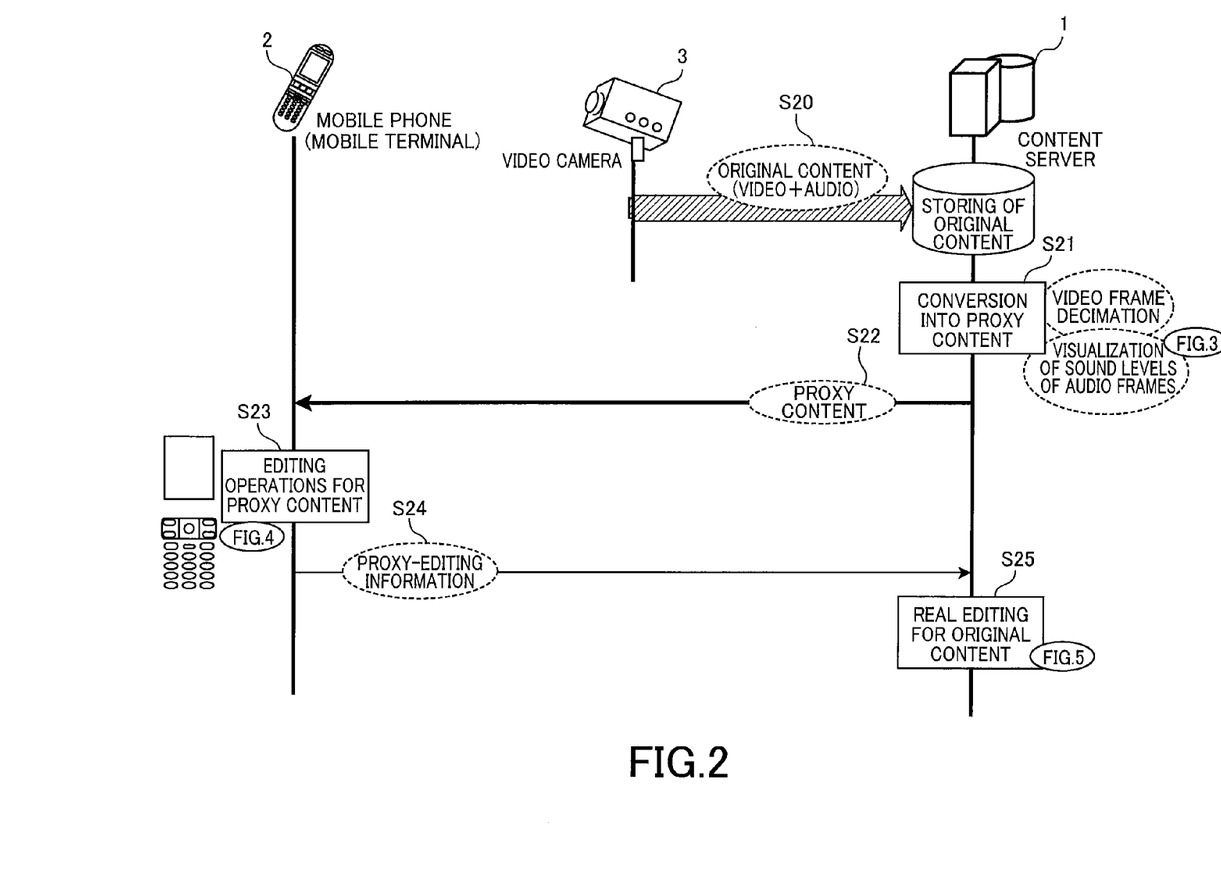
FIG. 2 is a sequence chart illustrating the operations in the system depicted in FIG. 1.

Referring next to FIG. 2, a sequence chart is illustrated to indicate the operations in the system according to the present embodiment.

(Step S20)

The video camera 3 uploads the previously-captured original content to the content server 1. Then, the content server 1 stores therein the received original content.

(Step S21)

The content server 1 converts or reformats data of the original content into data of the proxy content which can be played back by the mobile phone 2 and which is structured using the decimated video content obtained by extraction or selection of ones from a series of video frames of the original content at time intervals of a preset unit time.

For video content which is to be captured by a known digital video camera, a data compression scheme is employed which typically includes, but not limited to, MPEG-2 or H.264/MPEG-4 AVC. These compression schemes would allow any data to be stored in a storage device such as a hard disc, without alteration. These compression schemes would allow compressed data to be decoded or decompressed only using key frames of the compressed data which are called "Intra Pictures." The use of key frames would allow other frames to be compressed using temporal correlations between the key frames, with a reduced number of codes.

The decimated video content or stream can be generated by frame decimation, that is, extraction of only key frames from a series of video frames of the original content.

An additional process may be implemented to decimate some of the key frames, which would further reduce a video frame rate of the proxy content.

The preset unit time is a time interval between adjacent ones of the extracted key-frames, and these frames are arrayed in the proxy content at time intervals of the preset unit time. The proxy content is to be edited on the side of the mobile phone 2, and the preset unit time is preferably set to have a length of about 2 through about 5 [second].

Figure 3:
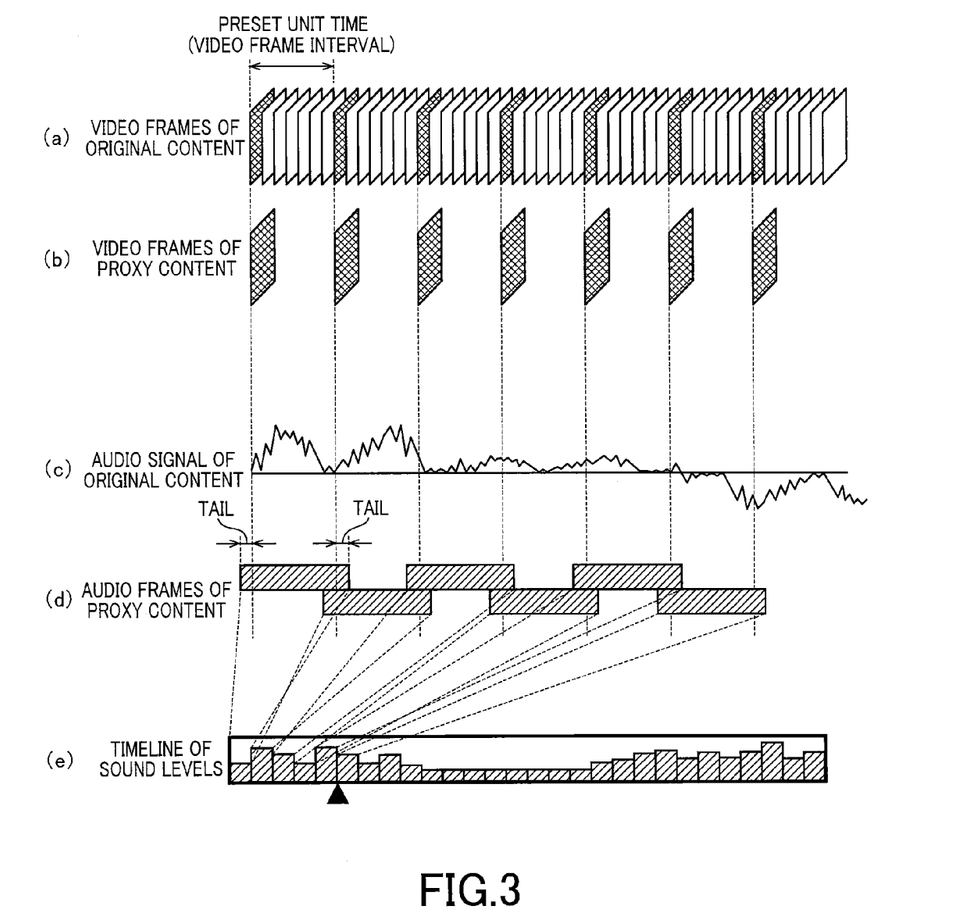
FIG. 3 is a schematic view structurally illustrating original content and proxy content used in the system depicted in FIG. 1.

Referring next to FIG. 3, the structure of the proxy content is illustrated in conjunction with the present embodiment.

More specifically, FIG. 3(a) illustrates a series of video frames of the original content. The series include Intra pictures, and some are extracted from these Intra pictures at time intervals of the preset unit time, wherein the extracted Intra pictures are video frames of the proxy content. FIG. 3(b) illustrates the video frames of the proxy content.

In addition, for explanation of the underlying facts in conjunction with the video frames of the proxy content, the larger the change in the motion vector (e.g., the average of absolute values of all the motion vectors in each video frame of the original content) between adjacent ones of the video frames of the original content, the smaller the similarity between adjacent ones of the video frames of the original content.

Therefore, in an alternative arrangement, the preset unit time between adjacent ones of the video frames of the proxy content may be preferably set, as a time-varying parameter, such that the length of the preset unit time becomes shorter, that is, such that the video frame rate of the proxy content becomes higher, as the frame-to-frame change in the motion vector of the original content becomes larger.

Conversely, the smaller the frame-to-frame change in the motion vector of the original content, the larger the frame-to-frame similarity of the original content.

Therefore, in a still alternative arrangement, the preset unit time between adjacent ones of the video frames of the proxy content may be preferably set, as a time-varying parameter, such that the length of the preset unit time becomes longer, that is, such that the video frame rate of the proxy content becomes lower, as the frame-to-frame change in the motion vector of the original content becomes smaller. When the number of skipped macroblocks is large, it can be determined that consecutive video frames have a large relative similarity.

In a yet still alternative arrangement, instead of or in addition to the above technique of employing the time-varying parameter, at least one of the resolution and the graduation of the video frames of the proxy content may be reduced or lowered, relative to those of the original content.

It is added that, in an alternative, the video frame rate of the proxy content, that is, the extracted-frame rate of the original content may be designated by the user of the mobile phone 2 via its user interface. In the alternative, the mobile phone 2, prior to the compression of the original content into the proxy content, sends to the content server 1, the video frame rate of the resulting proxy content, which has been designated by the user of the mobile phone 2.

Thus, the content server 1 can convert the original content into the proxy content, so that the proxy content can have the user-designated video frame rate (which is equivalent to the preset unit time spanning between video frames of the proxy content). In other words, the length of a time interval between video frames which are to be extracted from the original content can be controlled depending on the user-designated video frame rate of the proxy content.

Next, the original content will be described with regard to a case in which the original content is structured to further include an audio content. In this regard, the term "audio" is used to refer to not only a voice or speech signal in a narrow sense, which indicates human voice, but also a sound or acoustic signal indicative of music and any other things. FIG. 3(*c*) illustrates an audio signal included in the original content.

In this case, the content server 1 extracts audio frames from the original content, by dividing or segmenting an audio signal of the original content into a series of consecutive audio frames at time intervals having the same length as that of the preset unit time used for the video frame extraction from the original content.

The audio signal included in the original content is divided into consecutive audio frames such that these audio frames occur sequentially at the same rate as the video frame rate F[fps] of the proxy content, wherein a pair of one of the video frames and one of the audio frames which mutually and temporally correspond to each other constitutes one of consecutive units together constituting the entire proxy content, wherein it is of course that the total count of the units is not always an arbitral integer.

As a result, the entire audio division in the original content is partitioned into a plurality of sub-divisions each of which spans a range of [kF, (k+1)F], wherein "k" is a division parameter.

FIG. 3(*d*) illustrates audio frames of the proxy content. In this regard, each audio frame of the proxy content is defined to include in- and out-tails (i.e., extensions) which overlap with portions of two adjacent audio frames, that is, subsequent and previous audio frames. More specifically, the in-tail of each audio frame is duplicated to an overlapping portion of the subsequent audio frame, while the out-tail of each audio frame is duplicated to an overlapping portion of the previous audio frame.

The addition of these tails would smooth, to some extent, change in the sound level between adjacent audio frames to be combined for audio editing. Because of this, rapid change in the sound level would be improved into gentle change.

Given α as a tail length in time, each audio frame is defined to span a range of [kF-α, (k+1)F+α]. The presence of the tail length a provides partial overlaps between adjacent audio frames.

The sound level is calculated on a per-audio-frame basis. The sound level may be defined to indicate or replaced by, for example, the followings:

Information of the power of the audio signal,

Information of an increment/decrement of the audio signal,

Information of the count of the zero cross points of the audio signal, or

Information of the base frequency of the audio signal.

It is added that, in the event where the audio signal has two or more channels, the sound level may be calculated on a channel-by-channel basis, or as the average for all or some of the channels.

The sound levels for the audio frames are included in the proxy content in association with the respective video frames.

(Step S22)

The content server 1 sends the proxy content to the mobile phone 2. The proxy content is structured with the decimated video content (produced by decimating some of video frames of the original), and the sound levels of the audio frames which correspond to the respective video frames of the proxy content.

(Step S23)

The mobile phone 2 displays the proxy content on a display screen of a display section, and receives from the user, editing instructions or operations for editing the proxy content, to thereby create proxy-editing or indirect-editing information. Although this type of editing relates to an ultimate or direct editing for the original content, this type of editing is not rendered directly for the original content, and therefore, this type of editing is referred to as "proxy-editing."

Figure 4:
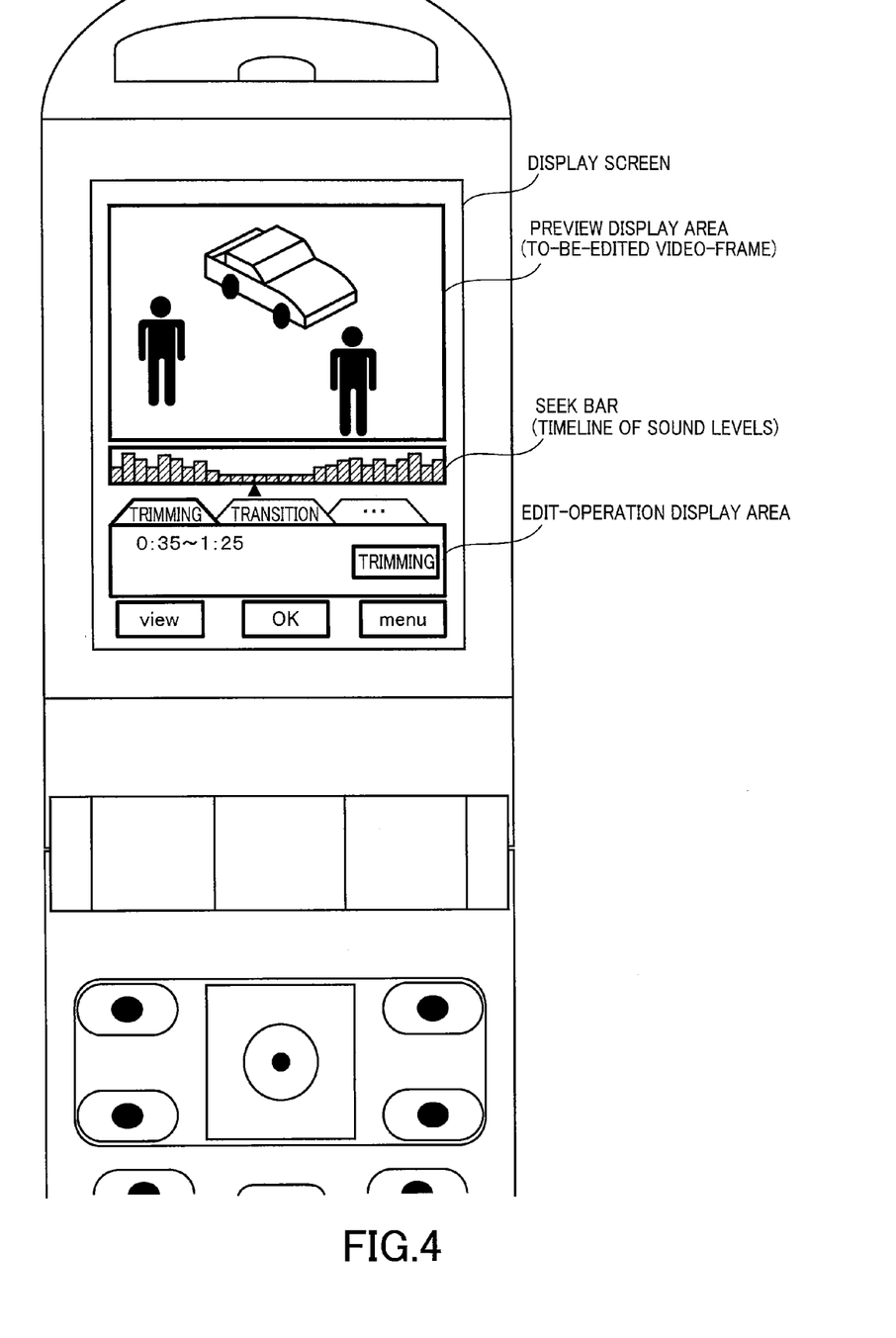
FIG. 4 is a fragmental front view of a display screen of a mobile phone depicted in FIG. 1.

FIG. 4 illustrates the display screen of the mobile phone 2 which is operated or manipulated by the user.

FIG. 4 illustrates exemplary objects on the display screen in operation. The objects include: a preview display area in which a to-be-edited one of the video frames of the proxy content is displayed; a seek bar which represents a timeline of the sound levels or which represents a time series of sound levels in a timeline manner; and an edit-operation display area which supports the user in conducting an editing operation, that is, in entering editing instructions.

The seek bar represents the timeline of the sound levels. The seek bar would allow the user to identify an edit point on the proxy content, because of visual representations indicative of progress in sound level in the seek bar, while viewing a to-be-edited video frame (i.e., a current video-frame) displayed on the preview display area, even in an attempt to edit the proxy content where the user cannot listen to the sound from the mobile phone 2, (e.g., where the user is located outside of the user's home). The seek bar provides the user's visual perception of the sound levels corresponding to the current video-frame, which helps the user in identifying an ideal edit-point in the proxy content.

The edit-operation display area acts as a user interface for allowing the user to cut away a portion of the video content, for example, for trimming or clipping. For cutting away a portion of the video content, information is required on a start time (In point) and an end time (Out point) of the portion to be cut away. The information is included in the proxy-editing information.

The proxy-editing information is stated in a meta language (e.g., Backus-Naur Form) which defines a context-free grammar. The proxy-editing information is stated using features, for example, as follows:

```
<feature> := <content><content>;
<content> := <content0>|<content0><transition information>|"";
<content0> := <starttime><endtime><filename><edittype>;
<edittype> := <edit0>|<edittype><edit0>|"";
<starttime> := <starttime in content0>;
<endtime> := <endtime in content0>;
<transition information> := <type of transition><duration>;
<filename> := <filename information of content0>;
<edit0> := <afterrecoding>|<effect>|<clipping>|<framing>|....
```

Transition is an image processing technique for combining two portions of content, which includes, for example, fade-in, fade-out, cross-fade, etc.

(Step S24)

The mobile phone 2 sends the proxy-editing information to the content server 1.

(Step S25)

The content server 1 actually edits the original content, in accordance with the received proxy-editing information.

Figure 5:
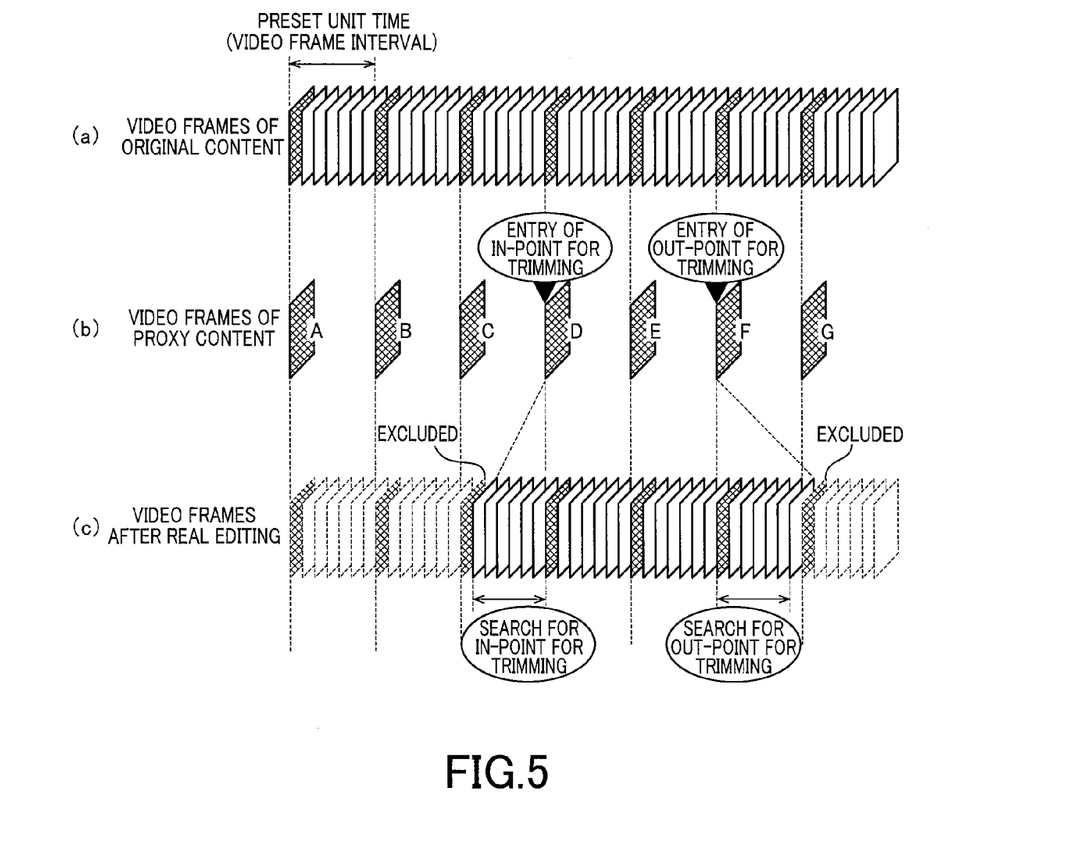
FIG. 5 is a schematic view illustrating how to assign an In point and an Out point of the proxy content to an In point and an Out point of the original content, respectively.

FIG. 5 is an illustrative view for an In point and an Out point for trimming the original content in the present embodiment. With reference to FIG. 5, the real editing by the content server 1 will be described.

FIG. 5(a) illustrates the video frames of the original content. FIG. 5(b) illustrates the video frames of the proxy content. As a result of the user's operation or manipulation for proxy-editing, an In point (provisional In point) and an Out point (provisional Out point) are designated for the trimming the proxy content.

FIG. 5(c) illustrates a search range for an In point (final In point) and a search range for an Out point (final Out point). The final In point and Out point are located on the original content, which are searched from the respective provisional In point and Out point on the proxy content. The search range for the final In point on the original content is defined from the provisional In point on the proxy content, and the search range for the final Out point on the original content is defined from the provisional Out point on the proxy content.

If a provisional In point is designated at key frame D in the proxy content, then the search region for the final In point is defined to span a region from a non-key frame immediately after a previous key frame C (i.e., one of the key frames just prior to a current key frame D), to the current key frame D, within the original context, whereby a search for the final In point is made over the search region.

If, alternatively, a provisional Out point is designated at key frame F in the proxy content, then the search region for the final Out point is defined to span a region from the current key frame F to a non-key frame immediately before a next key frame G (i.e., one of the key frames just next to video frame E), within the original context, whereby a search for the final Out point is made over the search region.

Parameters used herein are defined as follows:

$FR\_ed$: video frame rate of proxy content $FR\_org$: video frame rate of a original content (If the frame rate is variable, it is a maximum frame rate.)

$T\_ed$: points of time at ends of a portion which has been trimmed off the proxy content (1) For an In point, the search range for the final In point is as follows:

$T\_ed - 1/FR\_ed$ to $T\_ed$: conversion of point of time $(T\_ed - 1/FR\_ed) \times FR\_org$ to $T\_ed \times FR\_org$: conversion of frame Nos.

(2) For an Out point, the search range for the final Out point is as follows:

$T\_ed$ to $(T\_ed + 1)/FR\_ed$: conversion of point of time $T\_ed \times FR\_org$ to $((T\_ed + 1)/FR\_ed) \times FR\_org$: conversion of frame Nos.

The final In point (i.e., an actual cut-start point) and the final Out point (i.e., an actual cut-end point) are detected within the respective search ranges. The detection may be performed, for example, using at least one of the techniques disclosed in the second non-patent literature described before.

In an exemplary implementation, each actual cut point is detected by defining a plurality of frame pairs from all the video frames, wherein each frame pair is comprised of two adjacent video frames, by determining an image feature difference between each frame pair, and by determining one of the frame pairs which has the largest image feature difference as an actual cut point.

In the present embodiment, because the maximum number of candidate cut points is $FR\_org/FR\_ed$, the cut-point detection can be completed within a very short time.

The above-described technique allows actual cut points to be detected for the video frames of the original content.

In addition, there are various types of editing for combining two distant portions of original content which has been divided by cutting or trimming of the original content. If the proxy-editing information indicates cut-editing for two distant portions of the proxy content, then corresponding two distant portions of the original content are combined together such that one of them fades out, and the other fades in. If, however, the proxy-editing information indicates transition-editing for two distant portions of the proxy content, then corresponding two distant portions of the original content are combined together such that they are cross-faded.

In this regard, the effects such as fade-in, fade-out and cross-fade can be applied to not only video frames but also audio frames. Notably, for combination of audio frames, if two audio frames to be combined are not consistent in sound level with each other, then a sharp abrupt sound may occur. The use of such transition-editing would prevent such a sharp abrupt sound.

Figure 6:
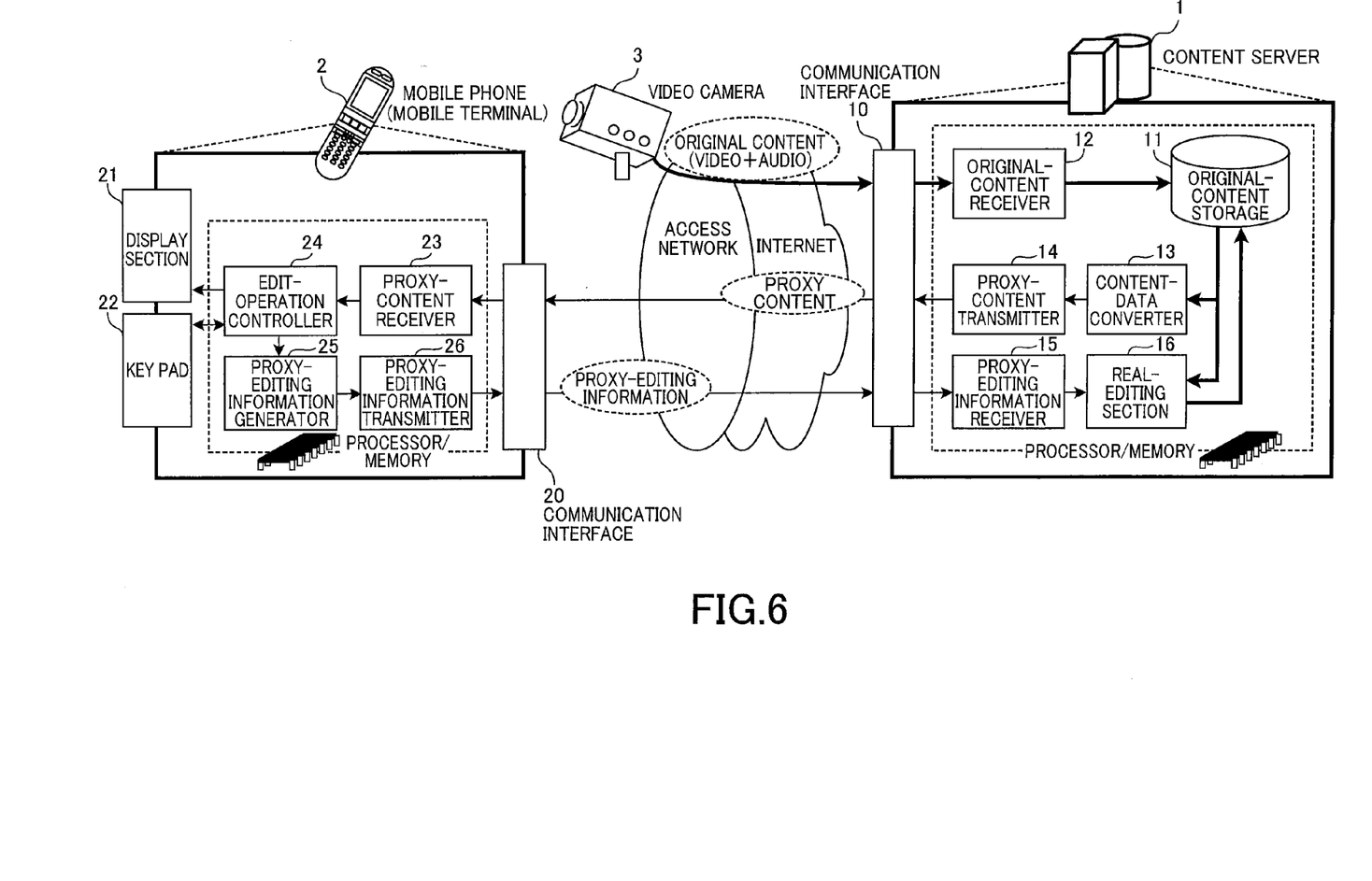
FIG. 6 is a functional block diagram illustrating a content server and the mobile phone both depicted in FIG. 1.

FIG. 6 illustrates in functional block diagram the content server 1 and the mobile phone 2.

As illustrated in FIG. 6, the content server 1 is configured to include: a communication interface 10; an original-content storage 11; an original-content receiver 12; a content-data converter 13; a proxy-editing-information receiver 15; and a real-editing section 16. These functional components excepting the communication interface 10 are implemented by causing a computer (not shown) to execute a particular program (not shown).

The computer is mounted in the content server 1. As is well known, the computer is constructed with a processor and a memory as illustrated in FIG. 6. The particular program is executed by the processor for implementing steps S21, S22 and S25 as illustrated in FIG. 2. This particular program has been previously stored in the memory such as a hard disc.

The original-content storage 11 has stored therein original content which has video content and audio content.

The original-content receiver 12 operates to receive the original content via the communication interface 10, and outputs the original content to the original-content storage 11.

The content-data converter 13 operates to convert the original content to downsized content for editing (i.e., the proxy content). The proxy content has a data size small enough for even the mobile phone 2 can play back the proxy content. The proxy content is structured by extracting some of the video frames of the original content at time intervals of the preset unit time. In other words, the proxy content has decimated video content. Therefore, the content-data converter 13 is for implementing the aforementioned step S21.

The proxy-content transmitter 14 operates to send the proxy content to the mobile phone 2. This proxy-content transmitter 14 is for implementing the aforementioned step S22.

The proxy-editing information receiver 15 operates to receive the proxy-editing information for the proxy content, from the mobile phone 2. The proxy-editing information is delivered to the real-editing section 16.

The real-editing section 16 is configured to actually the original content which has been stored in the original-content storage 11, based on the proxy-editing information. This real-editing section 16 is for implementing the aforementioned step S25.

As illustrated in FIG. 6, the mobile phone 2 is configured to include: a communication interface 20; a display section 21; a key pad 22, a proxy-content receiver 23; an edit-operation controller 24; a proxy-editing information generator 25; and a proxy-editing information transmitter 26. Among these functional components, the proxy-content receiver 23, the edit-operation controller 24, the proxy-editing information generator 25 and the proxy-editing information transmitter 26 are implemented by causing a computer (not shown) to execute a particular program (not shown).

The computer is mounted in the mobile phone 2. As is well known, the computer is constructed with a processor and a memory as illustrated in FIG. 6. The particular program is executed by the processor for implementing steps S23 and S24 as illustrated in FIG. 2. This particular program has been previously stored in the memory such as a hard disc.

The proxy-content receiver 23 operates to receive the proxy content from the content server 1. The received proxy content is delivered to the edit-operation controller 24.

The edit-operation controller 24 operates to display the proxy content on the display screen of the display section 21, and receives from the user of the mobile phone 2, an editing operation as user instructions for editing the proxy content, to thereby create proxy-editing or indirect-editing information.

In addition, the edit-operation controller 24 further operate to display or visualize the sound levels corresponding to the video frames of the proxy content which is currently displayed, on the timeline. This edit-operation controller 24 is for implementing the aforementioned step S23.

The proxy-editing information generator 25 operates to generate or create the proxy-editing information, in accordance with the user's editing operation conducted on the edit-operation display area. The generated proxy-editing information is delivered to the proxy-editing information transmitter 26.

The proxy-editing information transmitter 26 operates to send the proxy-editing information to the content server 1.

As will be evident from the foregoing detailed description, the present embodiment, because of its capability of allowing the user to view video content which is to be edited, in a decimated fashion, would allow the mobile phone 2, even if it has a very low processing capacity, to make it easier for the user to edit the video content having stored in the content server 1.

Further, the present embodiment, because of its capability of allowing the user to edit video and audio content while viewing not only video frames of decimated video content, but also the sound levels of audio frames of the audio content, would make it easier for the user to edit the content with the aid of the visual representations.

Additionally, the present embodiment allows the content server 1 to send to the mobile phone 2 only proxy content smaller in data size than original content, and allows the mobile phone 2 to send to the content server 1 only proxy-editing information smaller in data size than final- or real-editing information. Therefore, the present embodiment would save the cost incurred for the use of the network.

Still additionally, the present embodiment allows the mobile phone 2 to store proxy content, which does not require the mobile phone 2 to transmit any data to and receive any data from the content server 1 via the network, during a period in which the user is operating the mobile phone 2 for the proxy-editing, until completion of the proxy-editing. Superficially, the user conducts an editing operation for small-sized proxy content, but, substantially, the user conducts an editing operation for large-sized original content.

In the present embodiment, once the mobile phone 2 has received a complete set of the proxy content from the content server 1, the mobile phone 2 has no access to the content server 1, until completion of proxy editing. The mobile phone 2 can receive a complete set of the proxy content at a time, not in parts, because of the data size of the proxy content.

For high-quality content such as a movie or television broadcasting material, a high-precision editing operation is eventually required. In contrast, for low-quality content such as content captured by the user's video camera 3, even a low precision editing operation is acceptable.

The present embodiment would allow original content to be edited with a maximized precision to reflect the user's initial editing operation conducted for proxy content, even though the proxy content is of low quality.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of allowing a user of a communication terminal to instruct a content server to edit original content which is structured to include video content in the form of a series of video frames and which has been stored in the content server with which the communication terminal is communicable, the method comprising:

a first step of converting, by the content server, the original content into proxy content that has a data size smaller than that of the original content, and that is viewed by the user of the communication terminal on the communication terminal, for instructing the content server to edit the original content without downloading the original content from the content server;

a second step of transmitting, by the content server, the proxy content to the communication terminal;

a third step of playing back, by the communication terminal, the proxy content, and of producing proxy-editing information in response to a user's editing operation on the communication terminal;

a fourth step of transmitting, by the communication terminal, the proxy-editing information to the content server; and a fifth step of editing, by the content server, the original content in accordance with the proxy-editing information, wherein the original content further includes audio content represented by an audio signal, the first step includes:

creating video content of the proxy content, by performing a frame decimation process in which ones of the video frames of the video content of the original content are extracted, such that the extracted video frames occur at a decimating video-frame-rate that is lower than an original video-frame-rate of the original content, the created video content of the proxy content being in the form of a series of the extracted video frames;

creating audio content of the proxy content, by segmenting the audio signal of the audio content of the original content into a series of audio frames occurring at a frame rate substantially equal to the decimating video-frame-rate;

calculating a series of sound levels representative of local audio signals of the series of audio frames; and correlating the calculated sound levels and respective video frames of the video content of the proxy content with each other, and the third step includes playing back the video content of the proxy content by displaying the video content on a display screen, and visualizing a time series of ones of the calculated series of sound levels, in association with a successively-selected one of the video frames which is displayed on the display screen.

2. The method according to claim 1, wherein the first step comprises at least one of a sub-step of altering a level of the decimating video-frame-rate such that the level becomes higher as a change in a motion vector between adjacent ones of the video frames of the original content becomes larger, and a sub-step of reducing at least one of a resolution and a number of tone levels of the video frames of the proxy content, relative to the original content.

3. The method according to claim 1, wherein the communication terminal includes:

a preview display area in which a successively-selected one of the video frames of the proxy content is played back;

a seek bar representative of a time series of the sound levels, which help the user to identify an edit point on the video content of the proxy content; and an edit-operation display area that supports the user in conducting an editing operation.

4. The method according to claim 1, wherein the first step further includes a sub-step of defining each audio frame of the proxy content, such that each audio frame has a unique portion having a same length as that of the decimating video-frame-rate, and such that each audio frame has in- and out-tails extended from the unique portion forward and rearward, respectively, wherein the in-tail overlaps with a trailing end of a subsequent audio frame to each audio frame, and is duplicated to the trailing end, and the out-tail overlaps with a leading end of a previous audio frame to each audio frame, and is duplicated to the leading end.

5. The method according to claim 1, wherein the fifth step includes a sub-step of, when the proxy-editing information indicates that a portion of the proxy content which spans a range from an In point to an Out point should be cut away from the proxy content, editing the original content to cut away a portion of the original content which spans a range from one of a predetermined number of consecutive video frames of the original content which occur at and before the In point, to one of a predetermined number of consecutive video frames of the original content which occur at and after the Out point.

6. The method according to claim 1, wherein the fifth step includes a first sub-step of, when the proxy-editing information indicates that cut-editing should be rendered for the proxy content between two distant positions in the proxy content, combining corresponding two distant positions of the original content together such that one of the two fades in, and the other fades out, and a second sub-step of, when the proxy-editing information indicates that transition-editing should be rendered for the proxy content between two distant positions in the proxy content, combining corresponding two distant positions of the original content together such that the two are cross-faded.

7. A computer-readable non-transitory storage medium having stored therein a program which, when executed by a computer of a communication terminal, effects the method according to claim 1.

8. The method according to claim 1, wherein the communication terminal is a mobile terminal.

9. The method according to claim 1, wherein the first step is implemented to cause the content server to convert the original content to the proxy content, such that the proxy content has a data size small enough for the mobile terminal to process the proxy content.

10. A content server for editing original content in accordance with editing information from a communication terminal, wherein the original content is structured to include video content in the form of a series of video frames, and has been stored in the content server, the content server comprising:

an original-content storage storing the original content;

a content-data converter for converting the original content into proxy content that has a data size smaller than that of the original content, and that is viewed by a user of the communication terminal on the communication terminal, for instructing the content server to edit the original content without downloading the original content from the content server;

a proxy-content transmitter for transmitting the proxy content to the communication terminal;

a proxy-editing-information receiver for receiving proxy-editing information from the communication terminal; and a real-editing section configured to actually edit the original content in accordance with the proxy-editing information, wherein the original content further includes audio content represented by an audio signal, and the content-data converter includes:

a section of creating video content of the proxy content, by performing a frame decimation process in which ones of the video frames of the video content of the original content are extracted, such that the extracted video frames occur at a decimating video-frame-rate that is lower than an original video-frame-rate of the original content, the created video content of the proxy content being in the form of a series of the extracted video frames;

a section of creating audio content of the proxy content, by segmenting the audio signal of the audio content of the original content into a series of audio frames occurring at a frame rate substantially equal to the decimating video-frame-rate;

a section of calculating a series of sound levels representative of local audio signals of the series of audio frames; and a section of correlating the calculated sound levels and respective video frames of the video content of the proxy content with each other.

11. The content server according to claim 10, wherein the content-data converter comprises at least one of a section of altering a level of the decimating video-frame-rate such that the level becomes higher as a change in a motion vector between adjacent ones of the video frames of the original content becomes larger, and a section of reducing at least one of resolution and graduation of the video frames of the proxy content, relative to the original content.

12. A system comprising: a content server for storing original content which is structured to include video content in the form of a series of video frames; and a communication terminal communicable with the content server, wherein the content server includes:

an original-content storage storing the original content;

a content-data converter for converting the original content into proxy content that has a data size smaller than that of the original content, and that is viewed by a user of the communication terminal on the communication terminal, for instructing the content server to edit the original content without downloading the original content from the content server;

a proxy-content transmitter for transmitting the proxy content to the communication terminal;

a proxy-editing-information receiver for receiving proxy-editing information from the communication terminal; and a real-editing section configured to actually edit the original content in accordance with the proxy-editing information;

wherein the original content further includes audio content represented by an audio signal, the content-data converter includes:

a section of creating video content of the proxy content, by performing a frame decimation process in which ones of the video frames of the video content of the original content are extracted, such that the extracted video frames occur at a decimating video-frame-rate that is lower than an original video-frame-rate of the original content, the created video content of the proxy content being in the form of a series of the extracted video frames;

a section of creating audio content of the proxy content, by segmenting the audio signal of the audio content of the original content into a series of audio frames occurring at a frame rate substantially equal to the decimating video-frame-rate;

a section of calculating a series of sound levels representative of local audio signals of the series of audio frames; and a section of correlating the calculated sound levels and respective video frames of the video content of the proxy content with each other, and the communication terminal includes:

a proxy-content receiver for receiving the proxy content from the content server;

an editing-operation controller for playing back the video content of the proxy content by displaying the video content on a display screen, visualizing a time series of ones of the calculated series of sound levels, in association with a successively-selected one of the video frames which is displayed on the display screen, and receiving a user's editing operation;

a proxy-editing information generator for generating the proxy-editing information in response to the user's editing operation; and a proxy-editing-information transmitter for transmitting the proxy-editing information to the content server.

13. The system according to claim 12, wherein the communication terminal includes:

a preview display area in which a successively-selected one of the video frames of the proxy content is played back;

a seek bar representative of a time series of the sound levels, which help the user to identify an edit point on the video content of the proxy content; and an edit-operation display area that supports the user in conducting an editing operation.

14. The system according to claim 13, wherein the content-data converter of the content server further includes a section of defining each audio frame of the proxy content, such that each audio frame has a unique portion having a same length as that of the preset unit time, and such that each audio frame has in- and out-tails extended from the unique portion forward and rearward, respectively, wherein the in-tail overlaps with a trailing end of a subsequent audio frame to each audio frame, and is duplicated to the trailing end, and the out-tail overlaps with a leading end of a previous audio frame to each audio frame, and is duplicated to the leading end.

15. The system according to claim 12, wherein the proxy-editing information generator of the communication terminal includes a section of, when the proxy-editing information indicates that a portion of the proxy content which spans a range from an In point to an Out point should be cut away from the proxy content, editing the original content to cut away a portion of the original content which spans a range from one of a predetermined number of consecutive video frames of the original content which occur at and before the In point, to one of a predetermined number of consecutive video frames of the original content which occur at and after the Out point.

16. The system according to claim 12, wherein the real-editing section includes a first sub-section of, when the proxy-editing information indicates that cut-editing should be rendered for the proxy content between two distant positions in the proxy content, combining corresponding two distant positions of the original content together such that one of the two fades in, and the other fades out, and a second sub-section of, when the proxy-editing information indicates that transition-editing should be rendered for the proxy content between two distant positions in the proxy content, combining corresponding two distant positions of the original content together such that the two are cross-faded.

* * * * *